INVENTOR.
JOHN A. TOURTELLOT
BY Eugene M. Whitacre
Attorney

AUTOMATIC RECORD CHANGER

Filed Aug. 20, 1963 6 Sheets-Sheet 2

INVENTOR.
JOHN A. TOURTELLOT
BY Eugene M. Whitacre
Attorney

AUTOMATIC RECORD CHANGER

Filed Aug. 20, 1963 6 Sheets-Sheet 3

INVENTOR.
JOHN A. TOURTELLOT
BY

Attorney

INVENTOR.
JOHN A. TOURTELLOT
BY Eugene M. Whitacre
Attorney

March 7, 1967 J. A. TOURTELLOT 3,307,851

AUTOMATIC RECORD CHANGER

Filed Aug. 20, 1963 6 Sheets-Sheet 5

INVENTOR.
JOHN A. TOURTELLOT
BY Eugene M. Whitacre
Attorney

INVENTOR.
JOHN A. TOURTELLOT
BY Eugene M. Whitacre
Attorney 3,307,851

AUTOMATIC RECORD CHANGER

John A. Tourtellot, Indianapolis, Ind., assignor to Radio Corporation of America, a corporation of Delaware Filed Aug. 20, 1963, Ser. No. 303,257
4 Claims. (Cl. 274—15)

This invention relates to automatic record changer mechanisms of a type which includes a rotatable turntable and a tone arm mounted adjacent the turntable in a manner to permit a record tracking elment, such as a phonograph pickup, supported by the tone arm to track the grooves of successive records deposited on the turntable.

It is an object of this invention to provide an improved automatic record changer mechanism.

Another object of this invention is to provide an improved automatic record changer mechanism which is simple in construction, easy to manufacture at low cost, and reliable in operation.

Another object of this invention is to porvide an improved tone arm controlling mechanism of simplified construction for effecting movement of the tone arm from a record which has been played to the lead-in groove of the next record to be played.

A further object of this invention is to provide an improved automatic record changer mechanism including simple and efficient structure for disabling the record changing mechanism after the last record of a stack of records has been played.

An automatic record changer mechanism in accordance with the invention includes a tone arm supported on a rotatable tone arm shaft which is mounted adjacent a rotatable turntable. A phonograph pickup device is supported by the tone arm near the free end thereof for tracking the groove of a record supported on the turntable. In addition to being rotatably mounted, the tone arm shaft is also pivotally mounted.

During the playing of a record the axis of the tone arm shaft is held in a relatively fixed reference position as the tone arm scans the record. However, during a record changing cycle, mechanism is actuated to tilt or pivot the tone arm shaft in a manner to raise the free end of the tone arm clear of the turntable and any record which may be positioned thereon, and at such an angle as to cause the tone arm to rotate by force of gravity toward the outer edge of the turntable. Such a tilting or pivoting of the tone arm may be effected if a vertical plane through the tilted tone arm shaft axis extends on that side of the tone arm axis which is closer to the center of the turntable.

A tone arm landing position ramp, positioned near the periphery of records to be played, stops the outward movement of the tone arm. After a record to be played has been deposited on the turntable, the pivoting of the tone arm shaft is changed in a direction to lower the tone arm toward the record, while still maintaining an angle to provide a gravity bias of the tone arm toward the landing position ramp. The landing position ramp provides a cam surface to guide the tone arm downwardly to the proper position over the lead-in groove of the record to be played. After the phonograph pickup device supported in the tone arm has engaged the record, the record changing mechanism returns the tone arm shaft to its relatively fixed reference position to permit playing of the record on the turntable.

A feature of the invention comprises a simplified mechanism for deenergizing the turntable motor after the last record has been played. This mechanism comprises a shut-off lever which is loosely supported at one point, and which is driven by record changing mechanism at a second spaced point. During a record changing cycle, before the last record has been played, the shut-off lever effectively pivots about a first axis, and travels in a path which does not engage a control lever for an on-off switch. However, after the last record has been played, a record stabilizing arm, which previously extended over the top of the uppermost record of the stack of records to be played, drops to a lower position wherein the stabilizing arm shaft extends into the path of the shut-off lever during the next succeeding record changing cycle. The position of the stabilizing arm shaft relative to the shut-off lever is such that the shut-off lever effectively pivots about a second axis, and travels in a path which intercepts and operates the control lever to actuate the on-off switch to its "off" or open position.

If the on-off switch is moved to its off position too early in the record changing cycle to permit completion of the cycle, a second switch in parallel with the first switch may be provided for actuation of the record changing mechanism in such a manner that the second switch is only on during a record changing cycle, and is actuated to its off position just before the record changing cycle is completed.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

Figure 1:
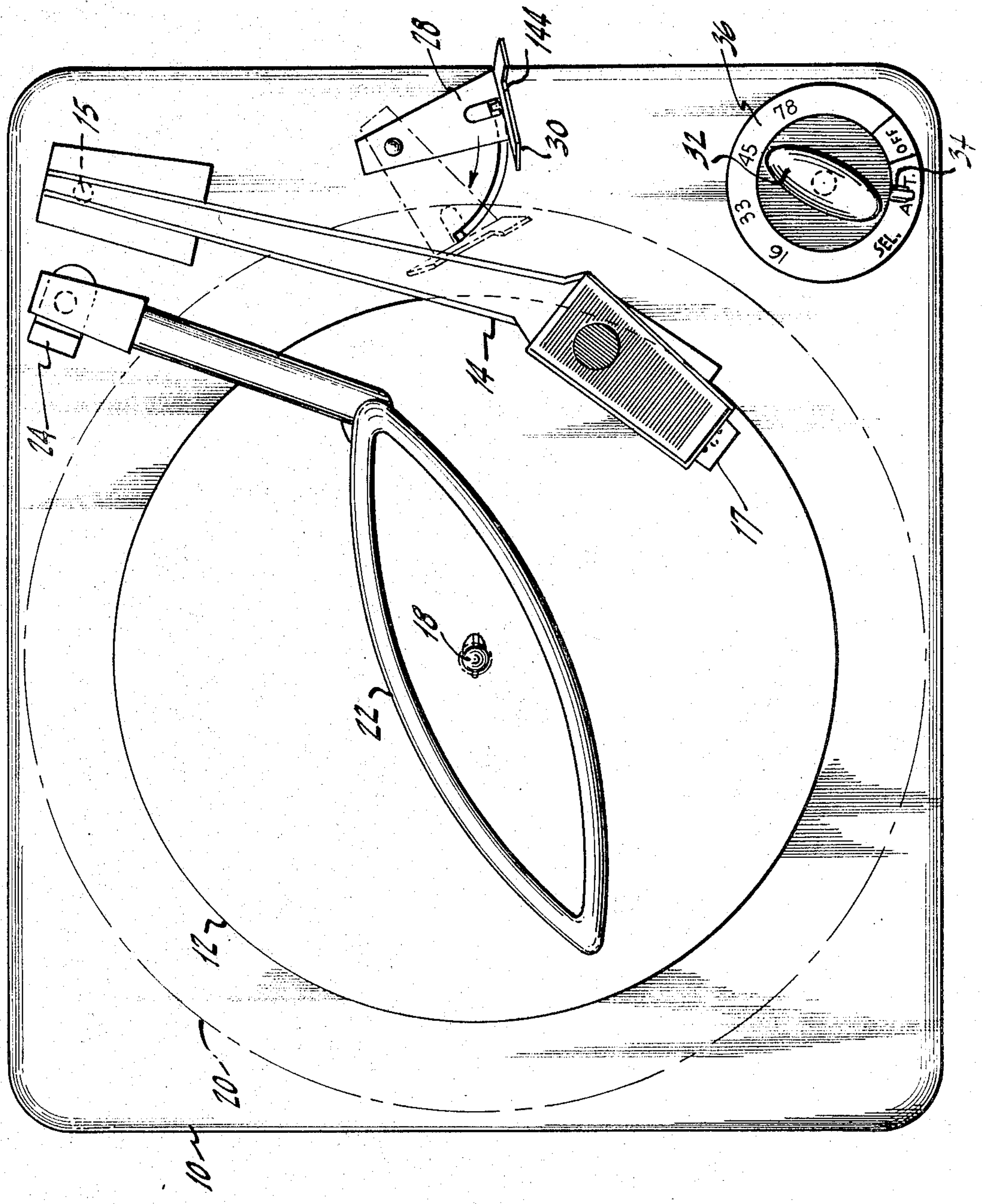
FIGURE 1 is a plan view of an automatic record changer embodying the invention.
Figures 2, 3, 4:
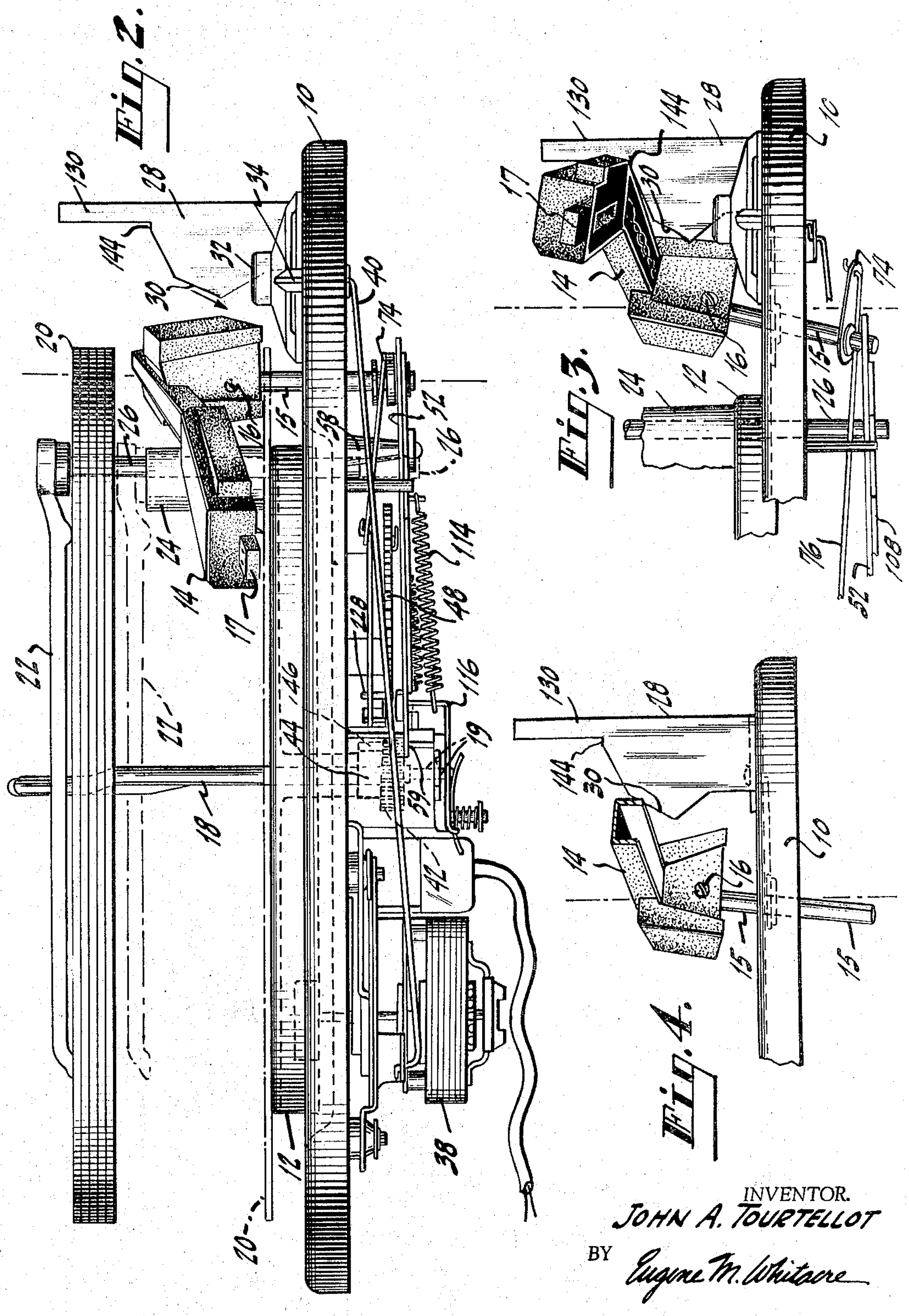
FIGURE 2 is a front elevational view of the automatic record changer shown in FIGURE 1.
FIGURES 3 and 4 are front elevational views, partially broken away, showing different positions of the tone arm during a record changing cycle.

Referring now to the drawings wherein like reference numerals will be used to indicate the same elements throughout the various figures, and particularly to FIGURES 1 and 2, the record changer includes a motorboard 10 which supports a rotatable turntable 12. A tone arm 14 is mounted on a tone arm shaft 15 for rotation therewith. In the present case the tone arm 14 is mounted on the shaft 15 to enable independent pivoting in a vertical plane to permit pickup servicing. A screw 16 in the tone arm housing is adjusted to bear against the tone arm shaft 15 to limit the downward movement of the tone arm 14 to a position slightly below the surface of a single record on the turntable 12. A phonograph pickup, not shown, is supported near the free end of the tone arm 14, and has a rotatable stylus changing control knob 17 extending from the free end of the tone arm.

A record centering spindle assembly 18 of known con- ruction projects upwardly from the center of the turn- ble 12, and is adapted to support a stack of records 20 hich are shown in dashed lines in FIGURE 1. The ›indle assembly 18 includes an offset spindle with an ternal lever 19 which is operative to displace the lower- ost record of the stack 20 into alignment with the bot- m portion of the spindle assembly during a record ıanging operation.

A record stabilizing arm 22 is mounted in a housing 24 ı the motorboard 10. The stabilizing arm 22 is mount- l to be moved upwardly high enough to clear the top the spindle assembly 18, and is rotatable to a position ear of the turntable so that records may be loaded on e spindle assembly. After records have been loaded ıto the spindle assembly, the stabilizing arm 22 is ro- ted over the spindle assembly 18 and lowered onto e top record of the stack to maintain the stack in a ›rizontal position. After the last record of the stack ıs been dropped to the turntable, the stabilizing arm ops to a lower position to provide an indication to the ıtomatic record changing mechanism that the last record ıs been dropped to the turntable. The record stabiliz- g arm 22 includes a shaft 26 which extends below the rntable 10 and cooperates with the record changing echanism to disable the record changer after the last cord has been played, as will hereinafter be explained.

A tone arm landing position ramp 28, mounted on the otorboard 10, provides a cam surface 30 which guides e tone arm 14 to the proper position over the lead-in oove of a record to be played. As shown in FIGURE the tone arm landing position ramp may be manually t to either of two positions for playing records of dif- rent diameters, which in the present case will be as- med to be 7" or 12" records. It will be apparent to ose skilled in the art, that any number of stop positions ay be provided for the tone arm landing position mp 28.

Also mounted on the motorboard 10 are a pair of con- ntrically mounted knobs 32 and 34. The knob 32 is upled with the turntable drive motor speed changing echanism to provide a speed control for the turntable at any of four different speeds indicated as 16 r.p.m., r.p.m., 45 r.p.m. and 78 r.p.m. The knob 34 serves a function control knob to turn the record changer f, to set it for automatic operation, or in the "SEL" ›sition to initiate a record changing cycle so that the wermost record of a stack of records supported on the indle assembly 18 will be dropped to the turntable 12. ı escutcheon 36 which is affixed to the motorboard 10 ovides indicia for setting the knobs 32 and 34.

As can be seen in FIGURES 2, 5, 8 and 9 a motor as- mbly 38 which includes speed changing mechanism is upled to drive the turntable 12 at different speeds of tation. The motor assembly 38 is coupled to the speed ector knob 32 by way of the motor speed change link , and a bell crank lever 41.

Figure 7:
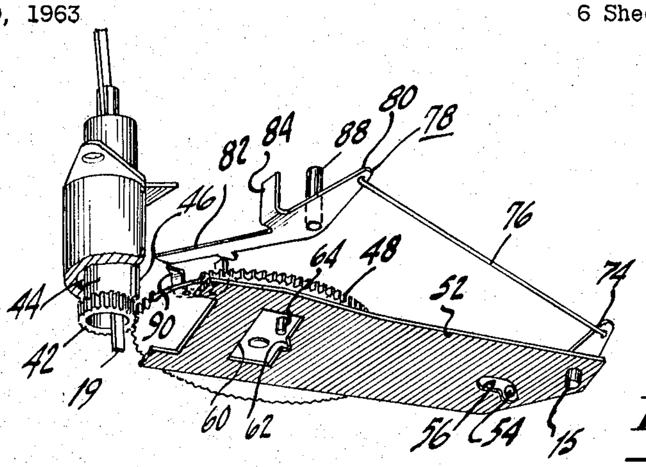
FIGURE 7 is a perspective view, partially broken away, to show the velocity tripping mechanism for initiating a record changing cycle.

As is best shown in FIGURE 7, the turntable 12, which rotatably mounted on the motorboard 10, includes as integral part thereof, a hub 44 which supports a drive ar 42. The hub 44 also has an integrally formed pro- tion 46 between the drive gear 42 and the turntable. ıe drive gear 42 operates the mechanism which effects automatic record change, and the projection 46 coop- ıtes with other mechanism to provide a velocity trip- ıg mechanism which initiates a record changing cycle.

Figure 5:
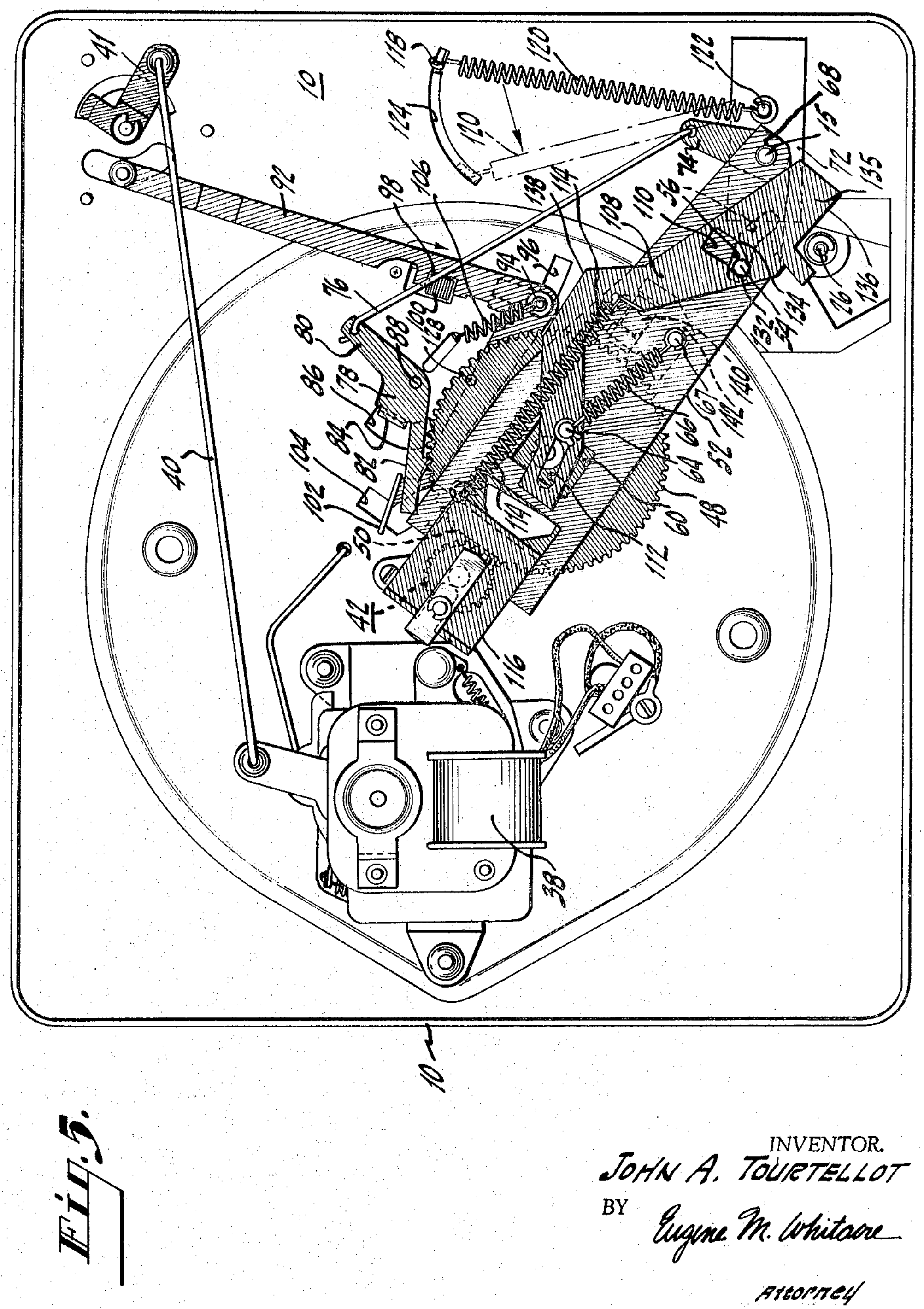
FIGURE 5 is a bottom view of the automatic record changer shown in FIGURE 1, showing the relative position of the various parts thereof during a record playing cycle.

The record changing mechanism as it appears during ecord playing cycle is indicated in the bottom view of record changer shown in FIGURE 5. During the ıying of a record, a cycling gear 48 which is rotatably ›unted on the bottom surface of the motorboard 10 has multilated portion 50, with no teeth, in registry with drive gear 42. Accordingly, the teeth of drive gear do not mesh with the teeth of the cycling gear 48, and no power is transmitted to the record changing mecha- nism.

Figure 6:
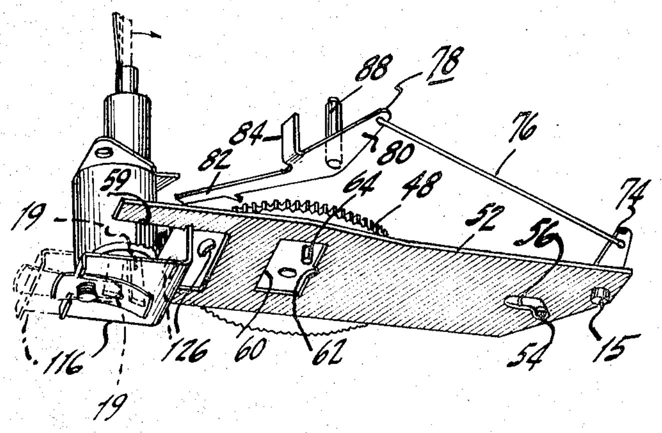
FIGURE 6 is a perspective view, broken away, showing the mechanism for actuating a lever mounted in the record supporting centering spindle assembly.

Mounted for reciprocating movement in a horizontal plane and appearing in FIGURE 5 above the cycling gear 48 (but below the gear 48 when the player is in upright position) is a cycling slide 52. The cycling slide 52 is mounted at one end by a screw 54 which extends through an elongated shaped slot 56 in the cycling slide into a boss 58 (see FIGURE 2) extending from the bottom side of the motorboard 10. The other end of the cycling slide 52, as best shown in FIGURE 6, is bifurcated, with each of the bifurcations captured in two separate slots on opposite sides of the housing supporting the drive gear 42. Only one slot 59 is visible (see FIGURE 2 or 6).

The cycling slide 52 includes a generally rectangular cutout portion 60 with a detent notch 62 (FIGURE 8) on one side thereof. The detent notch 62 is adapted to receive a drive pin 64 eccentrically mounted on the cy- cling gear 48. During a normal record playing cycle, the drive pin 64 is held (see FIGURE 5) in the detent notch 62 by a helical spring 66 which is under tension between the drive pin 64 and a stud 67 on the cycling slide 52.

An aperture 68 in the rear end of the cycling slide 52 is adapted to receive the free end of the tone arm shaft 15. The tone arm shaft 15 passes through a relatively loose bearing 72 on the motorboard 10 to permit rota- tion and pivoting of the shaft 15. During a record chang- ing operation, the reciprocating movement of the cycling slide 52 moves the free end of the tone arm shaft 15 causing it to pivot in the bearing 72 in a direction to move the free end of the tone arm clear of the record, and at such an angle relative to the axial position of the tone arm that the tone arm swings toward the outer pe- riphery of the record by force of gravity.

A clutch lever 74 is mounted on the tone arm shaft 15 in a manner such that the clutch lever 74 normally ro- tates with the tone arm shaft 15, but is clutched thereto for independent movement. The free end of the clutch lever 74 is coupled through a trip link 76 to a trip lever 78. The trip lever 78 includes a first pair of arms 80 and 82 in a horizontal plane and a third arm 84 which ex- tends vertically through a slot 86 in the motorboard 10. The trip lever 78 is pivotally mounted on a stud 88 which is fastened to the motorboard 10. The arm 80 of the trip lever 78 is driven by the trip link 76 to cause the arm 82 to move into contact with a trip pawl lever 90 (FIGURE 7) which is pivotally mounted on the cycling gear 48. The amount of the pivoting of the trip lever 78 is limited by the engagement of the third arm 84 with the ends of the slot 86.

The function control knob 34 (FIGURE 2) is pivotally fastened to one end of one arm of a V-shaped control lever 92 (FIGURE 5) which includes a vertically extend- ing stud 94 at the apex thereof. One end of the stud 94 extends through an L-shaped slot 96 on the motorboard 10 (FIGURE 5), and the other end extends in close proximity to the edge of the cycling slide 52. A rectan- gularly shaped cutout portion 98 on the control lever 92 engages the actuating arm 100 of an on-off switch which is in the electrical circuit of the turntable drive motor. A trip control arm 102 which is an integral portion of the control lever 92, at the other end of the other arm of the V, is captured in a slot 104 for movement in a path where- in the trip control arm 102 can strike the trip pawl le- ver 90 (FIGURE 7) mounted on cycling gear 48, to ini- tiate a record changing cycle. The control lever 92 (FIG- URE 5) is biased by a spring 106 away from the posi- tion where the trip control arm 102 can engage the trip pawl lever 90.

The last record stopping mechanism of the record changing mechanism includes a shut-off lever 108 which is pivotally supported about the screw 54. To this end the shut-off lever 108 includes a relatively large, shaped aperture 110 to permit pivoting of the shut-off lever 108 about two different axes. At one end of the shut-off lever 108, and remote from the shaped aperture 110, there is an elongated slot 112 which is received over the drive pin 64 on the cycling gear 48, to provide the driving movement for the shut-off lever 108. A spring 114 affixed between a tab on the shut-off lever 108 and a spindle actuating slide lever 116, urges the shut-off lever 108 (at one end of the slot 112) against the drive pin 64.

The tone arm landing position ramp 28 (FIGURE 1) includes a tab 118 (FIGURE 5) which extends beneath the motorboard 10, and is coupled to an overcenter spring 120 which is fixedly coupled to a stud 122. The overcenter spring operates to hold the tone arm landing position ramp in either one of two definitely established positions which are limited by engagement by the tab 118 with the end of the slot 124 in the motorboard 10 through which the tab extends.

In the operation of the record changer, a stack of records to be played, all of the same size, are threaded onto the spindle assembly 18, with the record stabilizing arm 22 rotated to a position outwardly away from the turntable. After the records have been threaded onto the spindle, the record stabilizing arm 22 is rotated into position over the spindle assembly 18, and lowered over the uppermost record to maintain these records in a horizontal position. The tone arm landing position ramp 28 is moved to the position corresponding to the diameter of the records to be played, which is in the position shown in solid lines in FIGURE 1 for 12" records. The speed selector knob 32 is set to the desired speed at which the records are to be played.

At this point the record changer is ready for operation, and the function control knob 34 is moved from its off position to the select (SEL) position. In the SEL position of the function control knob 34, the control lever 92 is caused to move the actuating arm 100 of the on-off switch from its off position (shown in phantom in FIGURE 9) to its on position to energize the drive motor associated with the motor assembly 38. The free end 102 of the control lever 92 is moved into engagement with the trip pawl lever 90 on the cycling gear 48 to cause the trip pawl lever to engage the projection 46 adjacent the drive gear 42 which rotates with the turntable. The rotation of the projection 46 against the trip pawl lever 90 causes the cycling gear 48 to be rotated so that the gear teeth of the cycling gear 48 mesh with those of the drive gear 42. As cycling gear 48 starts to rotate, in a clockwise direction as viewed in FIGURE 5, the drive pin 64 rides out of the detent notch 62, and along the lower side (as viewed in FIGURE 5) of the cutout 60 permitting the cycling slide 52 to move under force of the spring 66 in a direction toward the drive gear 42.

This motion of the cycling slide 52 pulls the tone arm shaft 15 inwardly, toward the center of record, causing the shaft 15 to pivot in its bearing 72 and raise the free end of the tone arm 14 upwardly away from the turntable. The angle of pivoting is such that the tone arm by force of gravity swings outwardly toward the edge of the motorboard, until stopped by the tone arm landing position ramp 28. It will be noted that the pivoting of the tone arm shaft 15 is at an angle such that the effective axis of the tone arm in any of the positions that the tone arm can assume during the playing of a record is always between the tone arm landing position ramp 28 and a vertical plane passing through the tilted tone arm shaft 15. Such an angle of tilting produces a gravity bias which tends to return the tone arm 14 toward the landing position ramp 28.

Figure 8:
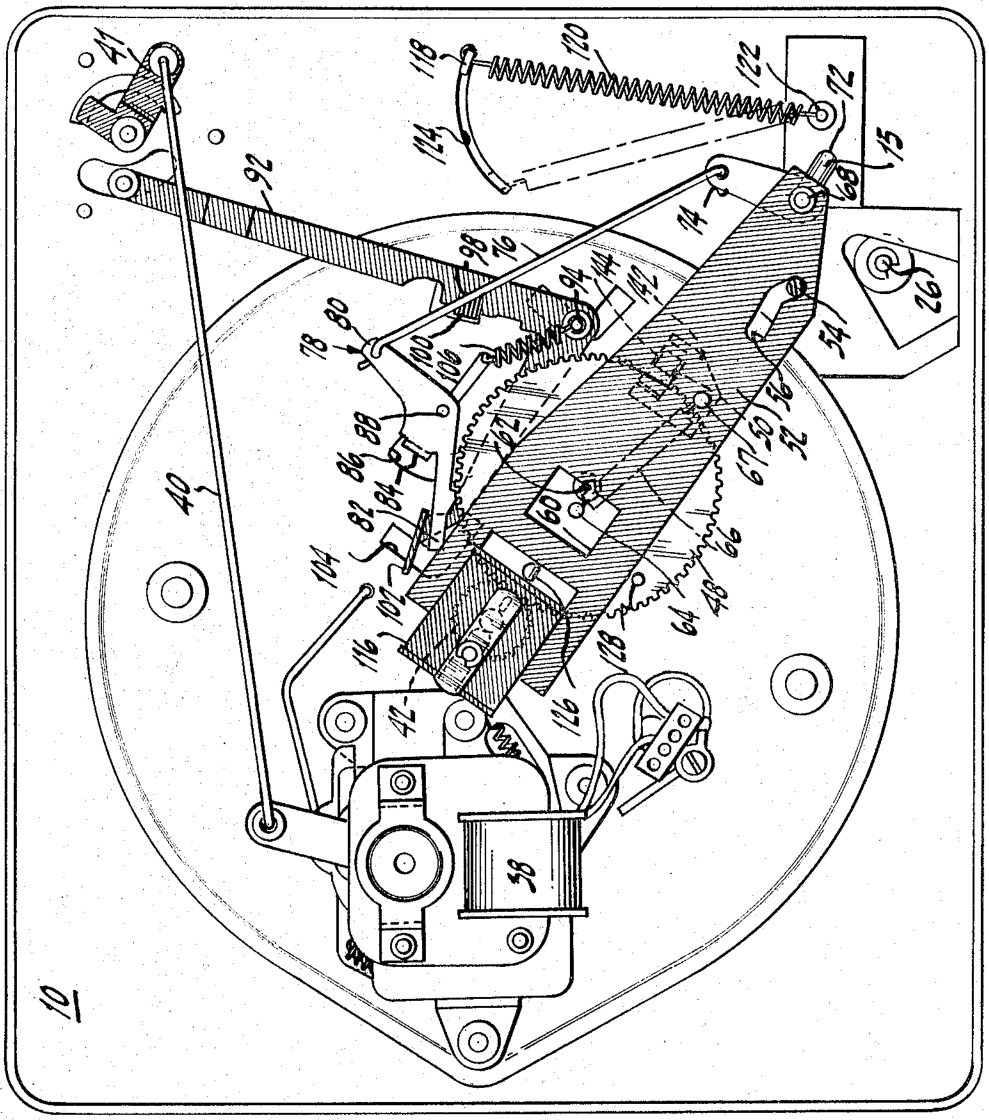
FIGURE 8 is a bottom view of the automatic record changer, showing the relative positioning of some of the parts at the time a record is dropped from the spindle assembly to the turntable.
Figure 9:
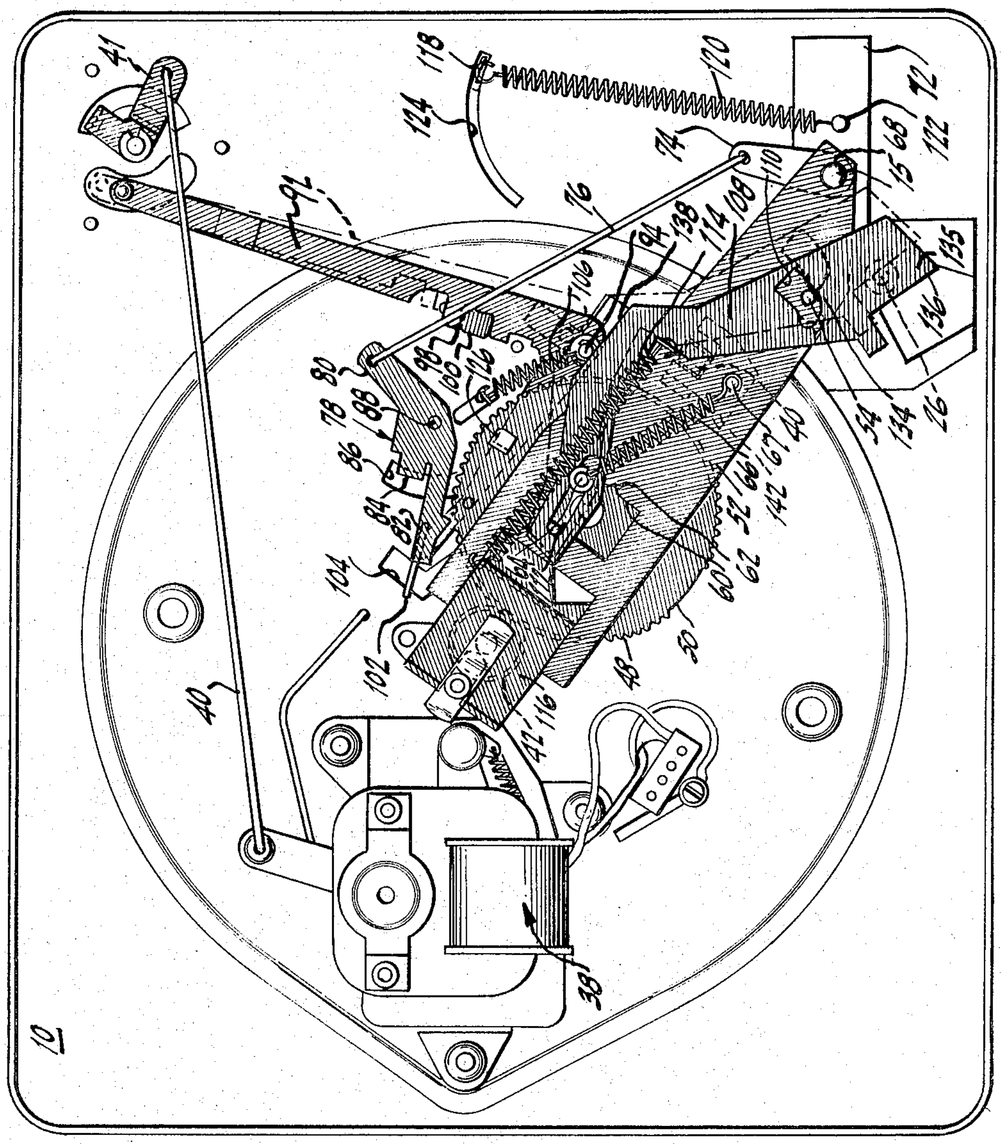
FIGURE 9 is a bottom view of the automatic record changer, showing in solid and phantom lines, the positions of certain portions of the mechanism to illustrate the operation of the last record shut-off mechanism.

At the innermost movement of the cycling slide 52, the curvature of the elongated slot 56 in the cycling slide 52 causes the cycling slide 52 to pivot slightly in a counterclockwise direction as viewed in FIGURE 8. This pivotal motion is translated to the tone arm shaft 15, and causes the tone arm 14 to ride upwardly on the tone arm landing position ramp 28 until stopped by a tone arm landing position ramp stop 130 (FIGURE 3) which is formed as an upstanding part of the ramp 28.

As the cycling gear 48 continues to rotate, the drive pin 64 disengages itself from the cycling slide 52, which has been stopped by the engagement of the screw 54 with the end of the slot 56, and moves in a path within the confines of the cutout portion 60 of the cycling slide. During this portion of the cycle a stud 126 on the cycling gear 48 is brought into engagement with the spindle actuating slide lever 116 to slide this lever in a direction away from the center of the cycling gear 48. During this operation, the end of the lever 19 (FIGURE 2) extending through the spindle assembly 18 is moved to effect a record changing operation.

The record changing operation may be effected in any of a number of known ways. In the present case, one end of the lever 19 extends into the centerhole of the lowermost record supported on the spindle and the other end thereof extends through a slot in the spindle actuating slide lever 116. The movement of the spindle actuating slide lever 116 causes the lever 19 in the spindle assembly to be pivoted in a manner to displace the lowermost record of the stack into alignment with the lower portion of the spindle assembly 18, whereupon the lowermost record drops to the turntable.

As the record changing cycle continues, a trip lever reset stud 128 projecting from the cycling gear 48 in the direction of the motorboard 10, engages the trip lever 78 to move it, and the clutch lever 74 on the tone arm shaft 15 (through the trip link 76), to a reference position as shown in FIGURE 5, which is out of the path of the trip pawl lever 90.

Continued rotation of the cycling gear 48 causes the drive pin 64 to reengage the edge of the cutout 60 on the cycling slide 52. The drive pin 64 then drives the cycling slide 52 back toward its initial position, causing the tone arm shaft 15 to be returned in a direction so that the axis thereof extends substantially vertically. As the angle of tilting of the tone arm shaft 15 is decreased the tone arm 14 which engages the tone arm landing position ramp 28 slides down the upper portion of the ramp until it engages the cam surface 30. At this point the speed with which the tone arm is lowered is reduced because the arc traversed by the drive pin 64 is flatter but sufficient tilting of the tone arm shaft 15 is maintained so that the edge of the tone arm is biased by gravity against the cam 30 as is shown in FIGURE 4. Eventually, after the tone arm 14 has slid down the cam surface 30 to permit the pickup stylus to engage the lead-in groove of the phonograph record to be played the cycling slide 52 returns to its reference position, at which time the tone arm shaft 15 is positioned so that its axis extends in a substantially vertical direction.

As the pickup stylus supported in the free end of the tone arm 14 follows the groove of a record being played the free end of the tone arm 14 is moved inwardly toward the center of the record. This motion is transmitted through the tone arm shaft 15 to the clutch lever 74 causing the clutch lever to be rotated in a counterclockwise direction as viewed in FIGURES 5, 8 and 9. The clutch lever 74 transmits the motion through the trip link 76 to the trip lever 78, causing the trip lever 78 to bear against the trip pawl lever 90. Since the movement transmitted to the trip pawl lever 90 during the playing of a record is of relatively small order, the projection 46 (FIGURE 2) adjacent the drive gear 42 brushes against the trip pawl lever 90 pushing it back out of the way. Such reverse motion is transmitted through the trip lever 78 and clutch lever 74 causing the clutch lever 74 to slip on the tone arm shaft 15.

After the playing of the record has been completed the relatively rapid motion of the tone arm 14 toward the center of the record causes a relatively rapid movement of the trip pawl lever 90, via the clutch lever 74

: trip link 76 and the trip lever 78, so that the trip wl lever 90 positively engages the rotating projection and causes the cycling gear 48 to be rotated so that : teeth thereof mesh with the teeth on the drive gear . A record changing cycle is then initiated and pro- esses in the manner described above. This process is ntinued until the last record of the stack drops to the ntable.

The operation of the last record shut-off mechanism will w be described. During record changing cycles in iich records are supported on the spindle assembly 18, : record stabilizing arm 22 is held up by the records that the end of the record stabilizing arm shaft 26 is a position between the motorboard 10 and the cycling de 52. When such a record changing cycle commences, : shut-off lever 108 is in the position shown in FIG- RE 5, with the screw 54 engaging the corner 132 of the erture of the shut-off lever aperture 110. As the drive 1 64 on the cycling gear 48 rotates in a clockwise di- ction toward the drive gear 42, the shut-off lever also oves in the same direction under the force of the spring 4. In so moving, the edge of the aperture 110 in the ıt-off lever 108 rides along the screw 54 until the screw gages the corner 134 of the aperture 110. With the ntinuing movement of the drive pin 64, the shut-off 'er effectively pivots about a point defined by the cor- r 134 of the aperture 110. As will be noted from FIG- RE 5, the free end 135 of the shut-off lever then rotates er the end of the stabilizing arm shaft 26, and an edge 8 of the shut-off lever does not reach and contact the d 94. Near the completion of the record changing cle, the drive pin 64 forces the shut-off lever 108 away om the drive gear 42 back to its initial position. Thus ring a record changing cycle with records still on the ndle assembly the shut-off lever performs no function.

During the record changing cycle which occurs after : last record of the stack to be played drops to the ntable, the stabilizing arm 22 drops to a reference sition wherein the record stabilizing arm shaft 26 ex- ds beside an edge 136 of the shut-off lever 108. The cord changing cycle begins in the manner as described ove. As the drive pin 64 begins its orbit, the shut-off 'er is permitted to slide in the direction of the drive ar 42 under the force of the spring 114. In so doing the ge of the shut-off lever aperture 110 between the cor- ars 132 and 134 rides along the screw 54. It will be ted that the edge of the aperture 110 between the cor- rs 132 and 134 is at an angle to the direction of the rce exerted by the spring 114, thereby causing the shut- ' lever 108 to rotate in a clockwise direction as viewed FIGURES 5 and 6. Just before the corner 134 of the erture 110 comes into engagement with the screw 54, : edge 136 of the shut-off lever engages the record bilizing arm shaft 26. Thus further movement by the ive pin 64 on the cycling slide 48 causes the shut-off 'er to be pivoted in a clockwise direction about the int of its engagement with the record stabilizing arm ıft 26.

Figure 10:
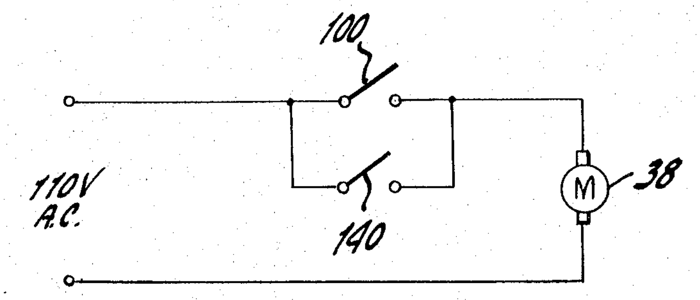
FIGURE 10 is a schematic circuit diagram showing the power connections to the turntable drive motor.

The clockwise pivoting (as viewed in FIGURE 9) of : shut-off lever about the point of contact with the rec- d stabilizing arm shaft 26, eventually causes the edge 8 of the shut-off lever to contact the stud 94 on the ntrol lever 92. The shut-off lever 108 pushes the stud to cause the control lever 92 to move to the position own in phantom in FIGURE 9, thereby causing the tuating arm 100 to open its associated switch. At this int, without more, the turntable driving motor portion the motor assembly 38 would be deenergized and the cord changing cycle would not be completed. Ac- rdingly, a second switch having an actuating arm 140 mounted on the motorboard 10 adjacent the cycling de 52. The second switch is connected in parallel with : first switch. A yoke 142 mounted on the cycling slide captures the actuating arm 140 of the second switch that when the cycling slide 52 is moved inwardly to- ırd the drive gear 42, the second switch is actuated to its on or closed position. As the cycling slide 52 moves back towards its reference position, the actuating arm 140 of the second switch is moved to its off or open position. In practice it has been found desirable to so position the yoke 142 relative to the actuating arm 140 that the second switch is opened just prior to the time when the record changing cycle is completed. Thus as will be seen from the motor power circuit diagram of FIGURE 10, even though the first switch is open during the latter portion of the record changing cycle after the last record has been played, the second switch completes the motor circuit so that power may be supplied to complete the last record changing cycle, after which the turntable motor is deenergized.

At the completion of the last record changing cycle the tone arm is positioned so that the pickup stylus engages the lead-in groove of the top record on the turntable. If desired, the tone arm may then be lifted and placed on a flat 144 of the tone arm landing position ramp 28. The tone arm remains in the flat 144 since the tone arm shaft 15 is vertical, whereas it cannot remain in the flat 144 during the record changing cycle due to the tilted position of the tone arm.

Several portions of the automattic record charger described herein are used in existing mechanisms. For greater detail as to the structure of the spindle assembly 18, and actuating mechanism therefor, the motor assembly 38, the turntable mounting, stabilizing arm 22 mounting and tone arm 14 mounting to the tone arm shaft 15, reference may be made to the RP–217, RP–218 series of automatic record changers manufactured by Radio Corporation of America.

What is claimed is:

1. In an automatic record changer of the type including a rotatable turntable, the combination of:
 a tone arm,
 a tone arm shaft mounted adjacent the turntable for rotation about its axis and for pivoting movement in a vertical plane,
 means for mounting said tone arm near one end thereof on one end of said tone arm shaft so that the free end of said tone arm is movable in a path to scan the groove of a record supported on said turntable,
 means coupled to said tone arm shaft and operative during a record changing cycle to cause said tone arm to pivot in said vertical plane in a direction to raise the free end of said tone arm and to cause said tone arm to move by force of gravity in an outward direction toward one side of said rotatable turntable, and
 a tone arm landing position ramp positioned adjacent said turntable to stop the movement of said tone arm, said tone arm landing position ramp including a surface for guiding said tone arm toward the starting position of a record deposited on said turntable, said means coupled to said tone arm shaft also being operative to cause said tone arm to ride upwardly on said ramp prior to it being guided toward the starting position of a record deposited on said turntable.

2. A tone arm controlling mechanism for an automatic record changer of the type including a rotatable turntable mounted on a motorboard and a tone arm, comprising:
 a tone arm shaft mounted on and extending through said motorboard for rotation and for pivotal movement in a vertical plane,
 means for mounting said tone arm on the end of said tone arm shaft extending above said motorboard so that a pickup device mounted in said tone arm at a point removed from said tone arm shaft is movable in a path to scan the groove of a record supported on said turntable,
 said tone arm shaft extending substantially vertically during a record playing cycle,
 tone arm controlling means coupled to the end of said tone arm shaft extending below said motorboard, said tone arm controlling means being operable to pivot said tone arm shaft in a direction to raise the tone arm and pickup device away from the turntable, said vertical plane extending to one side of the axis of said tone arm whereby said tone arm is biased by gravity to rotate in a direction away from said vertical plane, means including a tone arm landing position ramp for limiting the amount of rotation of said tone arm away from said vertical plane said tone arm controlling means also being operable to bias said tone arm against said limiting means to sequentially (1) ride upwardly on said ramp until engaging said limiting means and (2) ride downwardly on said ramp towards the starting position of a record deposited on said turntable, and means for actuating said tone arm controlling means during a record changing cycle to sequentially (1) pivot said tone arm from said substantially vertically extending position and (2) to return said tone arm to said substantially vertically extending position after said tone arm has engaged said limiting means.

3. In an automatic record changer of the type including a rotatable turntable, a spindle assembly for supporting disk phonograph records to be played, and a tone arm mounted on a rotatable tone arm shaft adjacent said turntable, the combination comprising:

a cycling slide positioned beneath said turntable for reciprocatory movement in a direction generally toward and away from the central axis of said turntable, means for coupling said tone arm shaft to said cycling slide, a tone arm landing position ramp mounted adjacent said turntable, automatic record changing cycle means coupled to said cycling slide, and means for periodically coupling said automatic record changing cycle means for driving movement with said turntable to move said cycling slide first in a direction generally toward the central axis of said turntable to pivot said tone arm shaft in a vertical plane which passes substantially through the center of said turntable whereby the free end of said tone arm is in a raised position with respect to said turntable and is biased by force of gravity toward the periphery of said turntable and into contact with said tone arm landing position ramp, said record changing cycle means operable to cause the lowermost record of a stack of records supported on said spindle assembly to be deposited on said turntable, and said record changing cycle means then being operable to move said cycling slide away from the central axis of said turntable in the direction of its initial position whereby the free end of said tone arm, gravity biased against said tone arm landing position ramp, is lowered along a surface of said tone arm landing position ramp toward the lead-in groove of the record which has been deposited on said turntable.

4. In an automatic record changer of the type including a rotatable turntable, a spindle assembly for supporting disk phonograph records to be played, and a tone arm, the combination comprising:

a tone arm shaft mounted for rotation and for pivotal movement in a vertical plane, means for mounting said tone arm on said tone arm shaft, a cycling slide positioned beneath said turntable for reciprocatory movement in substantially a horizontal plane generally toward and away from the central axis of said turntable, means for coupling said tone arm shaft to said cycling slide, a tone arm landing position ramp mounted adjacent said turntable, said ramp having a surface sloping downwardly toward said turntable, a rotatable cycling gear coupled to said cycling slide, and means for periodically coupling said cycling gear for driving movement with said turntable to move said cycling slide first in a direction generally toward the central axis of said turntable whereby said tone arm shaft is pivoted causing the free end of said tone arm to be raised with respect to said turntable and biased by force of gravity into contact with said tone arm landing position ramp, means operated by said cycling gear to cause the lowermost record of a stack of records supported on said spindle assembly to be deposited to said turntable after said tone arm engages said landing position ramp, and said cycling gear operative to move said cycling slide back toward its initial position after a record has been dropped to said turntable to cause the free end of said tone arm to be lowered along a surface of said landing position ramp toward the lead-in groove of a record on said turntable.

References Cited by the Examiner

UNITED STATES PATENTS

| | | | |
|---|---|---|---|
| 2,776,143 | 1/1957 | Caltagirone et al. | 274—13 |
| 2,888,267 | 5/1959 | Murro | 274—15 |
| 2,896,953 | 7/1959 | Da Costa et al. | 274—15 |
| 2,947,542 | 8/1960 | Grunwald | 274—23 X |
| 3,038,728 | 6/1962 | Glake et al. | 274—10 |
| 3,066,941 | 12/1962 | Van Antwerp | 274—10 |

NORTON ANSHER, *Primary Examiner.*

J. F. PETERS, *Assistant Examiner.*